United States Patent Office 2,967,187
Patented Jan. 3, 1961

2,967,187

PRODUCTION OF ANTHRAQUINONE

Carl Serres, Jr., Whiting, Ind., and Ellis K. Fields, Chicago, Ill., assignors to Standard Oil Company, Chicago, Ill., a corporation of Indiana No Drawing. Filed Dec. 31, 1958, Ser. No. 784,036

9 Claims. (Cl. 260—369)

This invention relates to an improved process for the production of aromatic compounds. It is concerned particularly with a process for the preparation of anthraquinone or substituted anthraquinones which have commercial value in the production of dyestuffs and as intermediates in organic synthesis.

A number of processes have been proposed for the production of anthraquinone in the past, of which only two have attained significant commercial utilization. One of these involves the oxidation of anthracene, a hydrocarbon derivative from coal-tar sources, to anthraquinone. However, anthracene is not readily obtainable in the pure state, and before it is oxidized to anthraquinone, it is essential that it be separated from other polycyclic hydrocarbon impurities such as phenanthrene, chrysene, fluorene and the like. This separation and purification of anthracene is particularly difficult and expensive in view of the close similarity in physical properties of anthracene and the impurities normally associated therewith.

In order to avoid the aforesaid difficulties, another process has been developed for commercial production of anthracene, involving Friedel-Crafts condensation of phthalic anhydride with benzene in the presence of aluminum chloride to form ortho-benzoyl benzoic acid. The acid thus formed is subjected to an intramolecular condensation by contacting with a dehydrating agent such as sulfuric acid or phosphorus pentoxide to produce the desired anthraquinone. While high yields of product are obtained in this way, the process is expensive, as effective Friedel-Crafts condensation of phthalic anhydride with benzene necessitates the use of at least two moles of aluminum chloride for each mole of phthalic anhydride used in the reaction. This large amount of aluminum chloride is consumed in the batch process employed to effect the desired condensation reaction, and is not recoverable for reuse. This excessive consumption of catalyst, as well as the use of a relatively expensive starting material such as phthalic anhydride contributes to the inherent costliness of the process.

It has now been found that anthraquinone or substituted anthraquinones can be obtained from relatively inexpensive raw materials employing catalysts which are not destroyed in the reaction and which can be regenerated and reused in the process.

Specifically, we have found that anthraquinones can be prepared by the following consecutive series of operations:

(1) Reaction of benzoic acid with alkyl substituted benzenes having at least one oxidizable alkyl group in the presence of phosphoric anhydride or polyphosphoric acid as catalyst to produce an alkyl substituted benzophenone.

(2) Separation of the alkyl substituted benzophenone from the catalyst, and recycle of the catalyst to the condensation reaction (step 1).

(3) Oxidation of the substituted benzophenone to an orthobenzoyl benzoic acid.

(4) Intramolecular condensation of the ortho-benzoyl benzoic acid with strong acid condensation catalysts to form anthraquinone or substituted anthraquinones.

From the above description of the process steps of our invention, it will be seen that our process differs basically from prior art processes employing phthalic anhydride as a starting material. Thus, it will be apparent that the prior art process employs a compound having an ortho-carboxylic acid group attached to the ring of the aromatic acid compound, while in our process benzoic acid is employed as a reactant, and the ortho-carboxylic acid group necessary for intramolecular condensation of the intermediate ortho-benzoyl benzoic acid compound to anthraquinone is formed in one step of the process by the oxidation of an alkyl substituent adjacent to the ketone group of the substituted benzophenone intermediate.

One advantage of our process consists in the use of benzoic acid rather than phthalic anhydride as a raw material for the production of anthraquinone, with attendant savings in reactant cost. Another advantage lies in the use of phosphoric anhydride or polyphosphoric acid rather than aluminum chloride as a catalyst, which permits recovery and recycle of the catalyst to the condensation reaction. A further advantage lies in the increased variety of substituted anthraquinones which can be prepared by the use of substituted alkylbenzenes having varied isomeric configurations, for example by the use of ortho, meta or para-xylene to produce carboxy-derivatives of anthraquinone, use of halogen substituted alkyl aromatics such as chloro-toluene or isomeric chloroxylenes to produce chloroanthraquinones or chlorocarboxy anthraquinones, etc.

In carrying out the process of our invention, benzoic acid is first condensed with an alkyl benzene in the presence of phosphoric anhydride or polyphosphoric acid as catalyst. We prefer to employ methyl substituted benzenes, including for example toluene; ortho, meta, or para-xylene or mixtures of xylenes, especially mixtures of meta and para xylene; halogenated derivatives of the above such as chlorotoluene, chloroxylene, and the like. While methyl substituted benzenes are preferred, we may employ any alkylbenzene having an oxidizable alkyl substituent which, in a later step of our process, is converted to a carboxylic acid group.

As the catalyst for the condensation of benzoic acid and the alkylbenzene we employ phosphoric anhydride or polyphosphoric acid. The latter is readily prepared by dissolving phosphoric anhydride in commercial syrupy phosphoric acid (85% $H_3PO_4$) or by dehydration of commercial phosphoric acid. The preparation of polyphosphoric acid is known to the art, e.g. as described by R. N. Bell, Industrial and Engineering Chemistry, vol. 40, page 1464 (1948). Polyphosphoric acid so obtained comprises a mixture of phosphorus oxides and hydrates thereof assaying 80–90% $P_2O_5$, preferably about 85% $P_2O_5$ (as compared to syrupy phosphoric acid which assays about 72% $P_2O_5$). We prefer to employ polyphosphoric acid as the catalyst since it is efficient, does not form tars or other undesirable byproducts, and can be recycled to the condensation reaction. Generally the polyphosphoric acid is employed in an amount of ½ part to about 4 parts by weight based on the benzoic acid used in the reaction, preferably between 1 and 2 parts. While the ratio of benzoic acid to hydrocarbon reactant is not critical, it is preferred that a molar excess of hydrocarbon be employed, for example from 1 to about 3 moles of hydrocarbon reactant per mole of benzoic acid.

The condensation of benzoic acid with the aromatic hydrocarbon reactant is effected at elevated temperature between about 150° C. and about 250° C. for a period of time sufficient to effect the desired reaction. Where reaction is effected at temperatures above the boiling point of the reactants, pressure vessels may be employed in order to maintain the reactants in the liquid form. Generally, reaction is complete in about 2–48 hours, the shorter periods of time being effective if the reactants are vigorously stirred so as to maintain thorough contact of the hydrocarbon reactant (which is insoluble in polyphosphoric acid) with the polyphosphoric acid phase containing dissolved benzoic acid.

The alkyl benzophenone or substituted alkyl benzophenone reaction product dissolved in excess hydrocarbon is readily separated from a lower immiscible catalyst phase and the desired benzophenone product recovered by distillation. The catalyst can be reused, preferably after extraction with hydrocarbon solvent to remove dissolved traces of hydrocarbon material. When polyphosphoric acid is employed, it can be fortified by addition of phosphoric anhydride, a portion of the catalyst layer being discarded or passed separately to a dehydration step where necessary to attain the desired $P_2O_5$ assay for polyphosphoric acid.

The condensation of benzoic acid with an alkyl substituted benzene will frequently result in the formation of an isomeric mixture of alkyl substituted benzophenones. Thus in the reaction of benzoic acid with toluene, a mixture of 2-methylbenzophenone and 4-methylbenzophenone will be obtained. Similarly in the reaction of benzoic acid with para-chlorotoluene, a mixture of 2-methyl-5-chlorobenzophenone and 5-methyl-2-chlorobenzophenone is produced. We have found that for the purposes of our invention, such isomeric mixtures need not be separated into their pure components, but can be subjected to the oxidation step of our process directly.

The oxidation of the alkyl substituted benzophenones obtained by the condensation of benzoic acid with alkylbenzenes can be effected by means of chemical oxidants such as chromic anhydride, nitric acid, potassium permanganate and the like, or by reaction with molecular oxygen in the liquid phase in the presence of heavy metal oxidation catalysts. We prefer to employ molecular oxygen as the oxidizing agent because it is cheap, effective and does not attack the aromatic ketone group of the benzophenone compound.

The alkyl substituted benzophenone compounds prepared as above described and having one or more oxidizable alkyl substituents can be oxidized by reaction in the liquid phase with molecular oxygen in the presence of heavy metal oxidation catalysts. We prefer to effect the oxidation in a lower aliphatic carboxylic acid solvent and in the presence of a catalyst comprising in conjoint presence bromine and a heavy metal oxidation catalyst. The use of this catalyst permits the conversion in high yield of one or more oxidizable alkyl substituents on an aromatic ring to the corresponding carboxylic acid group.

Oxidation can be effected in lower aliphatic carboxylic acids as solvents, including acetic acid, propionic acid, butyric acid and the like. Mixtures of acids can be employed. As metal oxidation catalysts, variable valence-heavy metals, especially those having atomic numbers from 23 to 29, inclusive, are employed. Mixtures of metals can be used. Cobalt, manganese and mixtures thereof are especially effective.

The oxidation is conducted at atmospheric or superatmospheric pressure, generally at a pressure at least sufficient to maintain liquid phase reaction conditions. Preferably temperatures of 100° C. to 250° C. are employed, and pressures conveniently of 200–600 p.s.i. when acetic acid is the solvent. The metal catalyst is employed in amounts of 0.01 to about 1% based on the aromatic compound and is preferably used in the form of an inorganic or soluble organic salt. Bromine as the free element, or in the form of inorganic or organic compounds capable of supplying bromine ion in the reaction mixture, is employed in an amount between about 0.1 and 10.0 gram atoms per atom of metallic oxidation catalyst. The oxidizing gas may comprise air, pure oxygen or mixtures of oxygen and inert gas.

The carboxy substituted benzophenone prepared as hereinbefore described can be recovered from the oxidation reaction mixture by filtration or by evaporation of the lower aliphatic carboxylic acid solvent. The solid residue can be recrystallized and further purified by dissolving in dilute aqueous caustic solution, followed by filtration and precipitation of the desired acid from the filtrate by addition of dilute mineral acid.

As mentioned above, the benzophenone carboxylic acid thus prepared may comprise a pure isomer, or a mixture of position isomers containing at least a portion of the 2-carboxy benzophenone. The carboxybenzophenone or mixture thereof is treated with strong mineral acid in order to effect intramolecular ring condensation of the 2-carboxy benzophenone compound. Preferably strong mineral acids such as concentrated sulfuric acid or polyphosphoric acid at temperatures between about 50° C. and about 200° C. are employed to effect ring closure. Generally, lower temperatures within the range indicated are preferred when using sulfuric acid, in order to avoid undesirable sulfonation of the benzophenone.

The cyclization reaction will effect ring closure of only the 2-carboxy benzophenone component of the oxidized alkyl substituted benzophenone. Other isomeric carboxybenzophenonones will not undergo the cyclization reaction, but will remain in the form of free acids. After treatment with sulfuric acid, the organic materials may be recovered by adding the sulfuric acid solution to ice, and separating solid products thus obtained by filtration. Unconverted benzoylbenzoic acids are separated from anthraquinones by washing with dilute caustic soda, and may be recovered by acidification of the washings. Thus the cyclization reaction not only effects production of the anthraquinone compound, but serves as an efficient means of separation of isomeric mixtures of 2-carboxy benzophenones and isomers thereof.

The following examples are described in detail in order to illustrate the practice of the invention, but the invention is not to be construed as limited with respect to reactants or reaction conditions employed therein.

*Example 1*

A steel autoclave equipped with stirring and heating means was charged with 250 parts benzoic acid, 333 parts toluene and 900 parts polyphosphoric acid (assay—85% $P_2O_5$). The reactor contents were stirred and heated at 200° C. for 40 hours. The reactor was then cooled to room temperature, the reaction mixture removed and the upper hydrocarbon layer separated from the lower colorless catalyst layer. The hydrocarbon layer was washed with dilute aqueous sodium hydroxide, dried and distilled. Toluene was removed overhead at atmospheric pressure, and the distillation continued under vacuum. The product (141 parts) had a boiling point of 110–114° C. at 0.1 mm. Hg and was identified as a mixture of 2-methylbenzophenone (35 parts) and 4-methylbenzophenone (106 parts). Unreacted benzoic acid (157 parts) was recovered by acidification of the caustic wash. The conversion was 35% and the yield based on converted benzoic acid was 95%.

Fifty parts of the mixture of 2-methylbenzophenone and 4-methylbenzophenone thus obtained was charged to a tubular reactor (equipped with heater, condenser, air inlet and valved exit means for controlling the exit flow of gases) together with 150 parts of glacial acetic acid, 0.4 part cobalt acetate, 0.8 part manganese acetate and 0.3 part ammonium bromide. The reactor was heated to 204° C. while passing air at 400 p.s.i.g. through the mixture at the rate of 0.13 cubic foot per minute. After oxygen absorption ceased (as determined by analysis of the exit gases), the reactor was cooled and the contents removed. Acetic acid was removed by evaporation on a steam bath and the residue dissolved in dilute caustic solution. The solution was filtered, the filtrate acidified, and the precipitated product filtered off and washed. There was obtained 52 parts of mixture of 2-benzoylbenzoic acid and 4-benzoylbenzoic acid (91% theoretical yield).

The crude mixture of acids thus obtained (1 part) was heated with 10 parts sulfuric acid at 100° C. for 1 hour. The sulfuric acid solution was poured into ice, and the 4-benzoylbenzoic acid extracted from the solid product by treatment with aqueous sodium hydroxide. Solid anthraquinone having a melting point of 285-286° C. was obtained in essentially quantitative yield based on the 2-benzoylbenzoic acid charged.

*Example 2*

450 parts of benzoic acid, 700 parts of p-chlorotoluene and 700 parts of phosphorus pentoxide were heated in a stirred, steel autoclave for 16 hours at 200° C. The reaction product was cooled, and the hydrocarbon layer separated from the solid catalyst. The hydrocarbon layer was washed with dilute sodium hydroxide to remove unreacted benzoic acid, dried over calcium chloride and fractionated under vacuum. There was obtained 177 parts of a mixture of methylchlorobenzophenones containing equal parts of 2-methyl-5-chlorobenzophenone and 5-methyl-2-chlorobenzophenone.

50 parts of this mixture were charged to a tubular reactor together with 150 parts glacial acetic acid and the same oxidation catalyst mixture employed in Example 1, and oxidized at 204° C. with air at 400 p.s.i.g. A total of 10 cubic feet of air was passed through the mixture. After oxygen absorption ceased, the reactor was cooled and the contents removed. The product was worked up as before, giving 50 parts (88.5% yield) of a mixture of 2-benzoyl-5-chlorobenzoic acid and 5-benzoyl-2-chlorobenzoic acid.

The crude mixture of acids thus obtained (5 parts) was treated with 50 parts concentrated sulfuric acid at 100° C. for 2 hours. The hot solution was poured onto ice, and the solid product filtered and extracted with aqueous sodium hydroxide solution. 2.5 parts of insoluble 2-chloro-anthaquinone were recovered and 2.3 parts 5-benzoyl-2-chlorobenzoic acid were obtained by acidification of the caustic extract.

*Example 3*

A mixture of 122 parts benzoic acid, 215 parts para-xylene and 500 parts polyphosphoric acid was charged to a glass, round bottom flask equipped with stirrer, reflux condenser and heating means. The mixture was vigorously stirred and heated at reflux (140° C.) for 30 hours, then cooled and diluted with water. The hydrocarbon phase was separated, washed with aqueous sodium hydroxide solution, dried and distilled. Unreacted para-xylene was removed at atmospheric pressure, and the distillation continued under vacuum. The product (115 parts) had a boiling point of 120-122° C. at 0.3 mm. Hg, melted at 32-34° C., and was identified as 2,5-dimethylbenzophenone.

Twenty-five (25) parts of the 2,5-dimethylbenzophenone thus obtained was charged to a tubular reactor together with 150 parts of glacial acetic acid, 0.6 part of a mixture of cobalt and mangenese acetates and 0.2 part ammonium bromide and oxidized at 204° C. with air at 400 p.s.i.g. After oxygen absorption ceased, the reactor was cooled, the contents removed and the product recovered. There was obtained 20 parts of crude benzophenone-2,5-dicarboxylic acid.

The crude acid thus obtained (2 parts) was treated with 50 parts concentrated sulfuric acid at 100° C. for 1.5 hours. The hot solution was poured onto ice and 1.4 parts of solid product separated by filtration. The yield of 2-anthraquinone carboxylic acid was 75%.

*Example 4*

Following the procedure of Example 3, 122 parts benzoic acid was reacted with 215 parts meta-xylene in the presence of 500 parts polyphosphoric acid at reflux for 40 hours. The reaction product obtained in a yield of 127 parts had a boiling point of 121-124° C. at 0.25 mm. Hg. and was identified as a mixture of 88% by weight 2,4-dimethylbenzophenone and 12% 2,6-dimethylbenzophenone.

Twenty-five (25) parts of this product was oxidized in glacial acetic acid following the procedure of Example 3. The product comprising a mixture of benzophenone-2,4- and 2,6-dicarboxylic acids was obtained in a yield of 93% of theory.

The mixed benzophenone dicarboxylic acids so obtained (2 parts) were treated with 50 parts concentrated sulfuric acid at 100° C. for 1.5 hours, and the acid solution then poured on ice. 1.8 parts (97% of theory) of a solid product comprising mainly anthraquinone-2-carboxylic acid was recovered.

We claim:

1. A process for the production of a compound selected from the group consisting of anthraquinone, carboxy-anthraquinones and chloro-anthraquinones which comprises reacting benzoic acid with a compound selected from the group consisting of alkyl benzenes and nuclear chlorinated alkylbenzenes having at least one methyl substituent in the presence of a catalyst selected from the group consisting of phosphoric acid and polyphosphoric acid at a temperature between about 150° C. and about 250° C. to produce a substituted benzophenone having a methyl substituent on the carbon adjacent to the ring carbon attached to the ketone group, oxidizing said substituted benzophenone with molecular oxygen in the liquid phase in a lower aliphatic monocarboxylic acid solvent and in the presence of a catalyst comprising in conjoint presence bromine and a heavy metal oxidation catalyst to convert said methyl substituent to a carboxylic acid group, effecting intramolecular ring closure of said oxidized benzophenone by contacting with an acidic reagent and separating said compound as a reaction product.

2. A process for the production of anthraquinone which comprises reacting benzoic acid with toluene in the presence of polyphosphoric acid at a temperature between about 150° and 250° C. to produce 2-methylbenzophenone, reacting said benzophenone with molecular oxygen in the liquid phase in a lower aliphatic monocarboxylic acid solvent in the presence of a catalyst comprising in conjoint presence bromine and a heavy metal oxidation catalyst to produce 2-carboxy benzophenone, contacting said 2-carboxy benzophenone with an acidic reagent and separating anthraquinone as a reaction product.

3. Process of claim 2 wherein said heavy metal oxidation catalyst comprises a mixture of cobalt and manganese.

4. Process of claim 2 wherein bromine is present in an amount between about 0.1 and 10.0 gram atom per atom of heavy metal.

5. A process for the production of carboxy-anthraquinone which comprises reacting benzoic acid with a xylene isomer selected from the group consisting of meta-xylene, para-xylene and mixtures thereof in the presence of polyphosphoric acid at a temperature between about 150° C. and 250° C. to produce dimethylbenzophenone, reacting said benzophenone with molecular oxygen in the liquid phase in a lower aliphatic monocarboxylic acid solvent in the presence of a catalyst comprising in conjoint presence bromine and a heavy metal oxidation catalyst to produce dicarboxy benzophenone, contacting said dicarboxy benzophenone with an acidic reagent selected from the group consisting of sulfuric acid and polyphosphoric acid and separating carboxy anthraquinone as a reaction product.

6. The process of claim 5 wherein meta-xylene is reacted with benzoic acid and the dimethylbenzophenone is oxidized in acetic acid as solvent.

7. The process of claim 5 wherein para-xylene is reacted with benzoic acid and the dimethylbenzophenone is oxidized in acetic acid as solvent.

8. A process for the production of chloro-anthraquinone which comprises reacting benzoic acid with chlorotoluene in the presence of phosphorus pentoxide at a temperature between about 150° C. and about 250° C. to produce methylchlorobenzophenone, reacting said methylchloro-benzophenone with molecular oxygen in the liquid phase in a lower aliphatic monocarboxylic acid solvent in the presence of an oxidation catalyst comprising in conjoint presence bromine and a heavy metal oxidation catalyst to produce carboxy chlorobenzophenone, contacting said carboxy chlorobenzophenone with sulfuric acid and separating chloroanthraquinone as a reaction product.

9. The process of claim 8 wherein said oxidation is effected in acetic acid in the presence of cobalt and manganese as heavy metal oxidation catalyst.

References Cited in the file of this patent

UNITED STATES PATENTS

| | | |
|---|---|---|
| 1,966,126 | Kranzlein | July 10, 1934 |
| 2,019,840 | Bienert | Nov. 5, 1935 |

FOREIGN PATENTS

| | | |
|---|---|---|
| 281,802 | Germany | Aug. 3, 1913 |
| 349,990 | Great Britain | June 29, 1933 |

OTHER REFERENCES

Ber. Deut. Chem., vol. 6, pages 753, 754 (1873).
Ber. Deut. Chem., vol. 7, pages 17–19 (1874).
Snyder et al.: J.A.C.S., vol. 77, No. 2, pages 364–365 (1955).